United States Patent [19]

Henrick

[11] 3,821,264

[45] June 28, 1974

[54] HALOHYDRINS OF 2,4-DIUNSATURATED ALIPHATIC CARBOXYLIC ESTERS

[75] Inventor: Clive A. Henrick, Palo Alto, Calif.

[73] Assignee: Zoecon Corporation, Palo Alto, Calif.

[22] Filed: May 11, 1972

[21] Appl. No.: 252,383

[52] U.S. Cl............. 260/408, 260/348 A, 260/405, 260/400, 424/312, 424/318, 424/DIG. 12
[51] Int. Cl.......................... C07c 69/66, A01n 9/24
[58] Field of Search.................................... 260/408

[56] References Cited
UNITED STATES PATENTS 3,193,565   6/1965   Tschesche et al. ................. 260/408
3,706,733   12/1972   Henrick et al. ................. 260/327 E Primary Examiner—Lewis Gotts
Assistant Examiner—Diana G. Rivers
Attorney, Agent, or Firm—Donald W. Erickson; Lee-Louise H. Priest

[57]          ABSTRACT

Novel unsaturated aliphatic carboxylic esters substituted at C-4 with a halogen atom, intermediates therefor, and the control of insects.

10 Claims, No Drawings

HALOHYDRINS OF 2,4-DIUNSATURATED ALIPHATIC CARBOXYLIC ESTERS

This invention relates to new unsaturated aliphatic carboxylic esters substituted at C-4 with a halogen atom, synthesis thereof, intermediates therefore, and the control of insects. More particularly, the new carboxylic esters of the present invention are represented by the following formula (A):

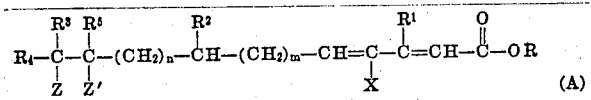
(A)

wherein,
m is zero, one or two;
n is one, two or three;
X is a halogen atom;
R is hydrogen, lower alkyl, cycloalkyl, aryl or aralkyl;
each of $R^1$, $R^2$, $R^3$ and $R^4$ is lower alkyl;
$R^5$ is hydrogen or methyl;
Z is hydrogen, lower alkyl, halogen atom, hydroxy, lower alkoxy or lower acyloxy; and
Z' is hydrogen or, together with Z, a carbon-carbon bond.

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Alphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 μg. to 10 μg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula A. Generally, a concentration of less than 25 percent of the active compound is employed. The formulations can include insect attractants, emulsifying agents or wetting agents to assist in the application and effectiveness of the active ingredient.

In the description hereinafter, each of R–$R^5$, X, Z and Z' is as defined above, unless otherwise specified.

In one embodiment of the present invention, the compounds of formula A, wherein Z' is hydrogen, are synthesized according to the following outlined method:

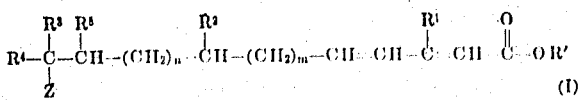
(I)

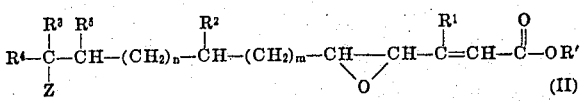
(II)

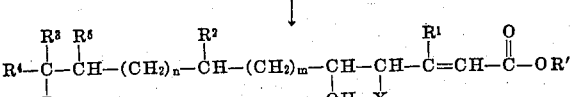
(III)

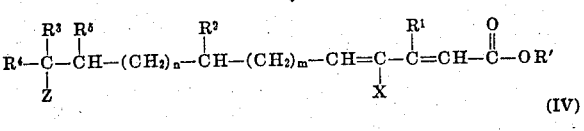
(IV)

In the practice of the above outlined synthesis, a 2,4-diunsaturated ester of formula I is reacted with a peracid, such as m-chloroperbenzoic acid or perphthalic acid in an organic solvent to form the 4,5-epoxide of formula II. The 4,5-epoxide is converted into the halohydrin (III) by treatment with the appropriate hydrogen halide in an organic solvent. The halohydrin (III) is then converted into the corresponding 5-mesylate by treatment with methanesulfonyl chloride, which is treated with 1,5-diazobicyclo[5.4.0]undec-5-ene to prepare the 4-halo-2,4-diunsaturated ester of formula A' (R' represents lower alkyl, cycloalkyl, aralkyl or aryl).

In another embodiment of the present invention, 4-halo-2,4-diunsaturated compounds and 4-halo-triunsaturated compounds (Z' together with Z is a carbon-carbon bond) of formula A are prepared by the reaction of a phosphonate of formula IV with an an aldehyde of formula V. This reaction is conducted in the presence of a base, such as sodium hydride, in an organic solvent (R'' is lower alkyl).

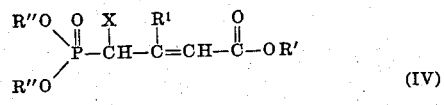
(IV)

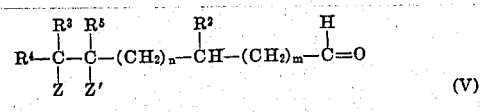
(V)

In another embodiment of the present invention, compounds of formula A are prepared by ylid reaction using ylid of formula VI in reaction with an aldehyde of formula V. The ylid (VI) can be prepared using the procedure of Markl, Chem. Ber. 94, 2996 (1961) and ibid., 95, 3003 (1962) starting with an ylid of formula VII. $R^6$ represents aryl, aralkyl or cycloalkyl.

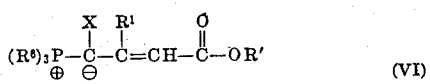

(VI)

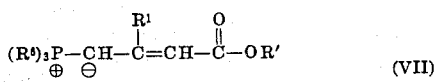

(VII)

Acids of formula A (R is hydrogen) can be prepared by hydrolysis with base, such as potassium carbonate in an organic solvent, such as a lower alcohol. Other esters of formula A can be prepared by conversion of the acid into the acid halide as by treatment with oxalyl chloride, or the like, and then reaction of the acid halide with the alcohol corresponding to the ester moiety desired.

The tri-unsaturated esters of formula A (Z' together with Z is a carbon-carbon bond) also serve as precursors for compounds of formula A wherein Z' is hydrogen and Z is halogen atom, hydroxy, alkoxy or acyloxy. Compounds of formula A wherein Z is halogen atom can be prepared by treatment of the tri-unsaturated precursor (A) with hydrogen halide in an organic solvent. Compounds of formula A wherein Z is hydroxy can be prepared from the tri-unsaturated precursor by the addition of water to the terminal olefinic bond using a mercuric salt followed by reduction using a borohydride, hydrazine or sodium amalgam. By conducting this reaction in the presence of an alcohol, such as methanol, ethanol isopropanol, t-butanol, and the like, the corresponding ether (Z is alkoxy) is prepared. See Brown and Rei, J. Am. Chem. Soc. 91, 5646 (1969) and Wakabayashi, J. Med. Chem. 12, 191 Jan. 1969). Compounds of formula A wherein Z is acyloxy can be prepared from the hydroxy precursor (A, Z is hydroxy) by reaction with a carboxylic acid chloride or anhydride.

The di-unsaturated esters of formula I and the aldehydes of formula V can be prepared as described in application Ser. No. 187,897 and Ser. No. 187,898, each filed Oct. 8, 1971, now U.S. Pat. Nos. 3,755,411 and 3,752,843 respectively, the disclosures of which are incorporated by reference.

The term "lower alkyl," as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "cycloalkyl," as used herein, refers to a cyclic alkyl group containing three to eight carbon atoms, e.g., cyclopropyl, cyclopentyl and cyclohexyl.

The term "aralkyl," as used herein, refers to a monovalent hydrocarbon group in which a hydrogen atom of a lower alkyl group is substituted by an aryl group, such as benzyl, phenethyl, methylbenzyl, naphthylmethyl and naphthylethyl containing from seven to 12 carbon atoms.

The term "lower acyloxy," as used herein, refers to an aliphatic hydrocarbon carboxylic acyloxy group of one to six carbon atoms.

The presence of an olefinic bond at position C-2 and C-4 of the compounds of formula A give rise to four isomers, each of which is embraced by the present invention. The presence of three olefinic bonds in compounds of formula A give rise to eight isomers, each of which is embraced by the present invention. As mentioned above, a mixture of isomers is suitably employed for the control of insects, such as a mixture containing the trans(2), trans(4) isomer and the cis(2), trans(4) isomer. The conditions of the syntheses described herein and the reactants can be selected so as to favor formation of one isomer, such as the all trans isomer, over the formation of other isomers. The selection of appropriate conditions and reactants to favor formation of one isomer over another will be apparent to those of ordinary skill in the art giving due consideration to the specific examples hereinafter. In the specific examples hereinafter, when isomerism is not specified, it is understood to include a mixture of isomers which, if desired, can be separated using known separation methods.

The following examples are provided to illustrate the practice of the present invention. Temperature is given in degrees Centigrade.

The term "halogen atom," as used herein, refers to bromo, chloro, fluoro and iodo.

EXAMPLE 1

To 15 g. of ethyl 3,7,11-trimethyldodeca-2,4-dienoate in 100 ml. of methylene chloride is slowly added 12.6 g. of 85 percent m-chloroperbenzoic acid in 120 ml. of methylene chloride with stirring and maintaining temperature at about 25°. After addition is complete, the reaction mixture is left at room temperature for four days. Sodium bicarbonate (5 percent) is added and the mixture extracted with ether. The organic phase is washed with 5 percent sodium bicarbonate, water and brine, dried over calcium sulfate and solvent removed under reduced pressure to yield ethyl 4,5-oxido-3,7,11-trimethyldodec-2-enoate, which can be purified by thin-layer chromatography eluting with ether/hexane (1/3).

Following the process of this example, ethyl 4,5-oxido-11-methoxy-3,7,11-trimethyldodec-2-enoate is prepared from ethyl 11-methoxy-3,7,11-trimethyldodeca-2,4-dienoate.

EXAMPLE 2

To 1.4 ml. of concentrated hydrochloric acid (37 percent) is added 2 g. of ethyl 4,5-oxido-3,7,11-trimethyldodec-2-enoate in 20 ml. of anhydrous ether, with stirring, below 5°. Stirring is continued for three hours. Excess HCl is neutralized with solid sodium carbonate. The aqueous layer is saturated with ammonium sulfate, separated and extracted with ether. The ether solutions are combined, washed with 5 percent ammonium sulfate, dried over sodium sulfate and concentrated. The concentrate is diluted with ether and chromatographed on one meter plates eluting with ether/hexane (1/5) to give ethyl 4-chloro-5-hydroxy-3,7,11-trimethyldodec-2-enoate.

By use of the above process, ethyl 11-methoxy-4-chloro-5-hydroxy-3,7,11-trimethyldodec-2-enoate is prepared from ethyl 11-methoxy-4,5-oxido-3,7,11-trimethyldodec-2-enoate.

EXAMPLE 3

Methanesulfonyl chloride (0.43 ml.) is added to a solution of 0.9 g. of ethyl 4-chloro-5-hydroxy-3,7,11-trimethyldodec-2-enoate and 0.43 g. of triethylamine in 30 ml. of methylene chloride at 0°. The reaction mixture is stirred for 1 hour. The mixture is diluted with methylene chloride, washed with ice water, 10 percent HCl solution, saturated sodium bicarbonate solution and brine, dried over calcium sulfate and solvent evaporated under reduced pressure to yield ethyl 4-chloro-5-methanesulfonyloxy-3,7,11-trimethyldodec--2-enoate, which can be purified by thin-layer chromatography.

In the same way, ethyl 4-chloro-5-methanesulfonyloxy-11-methoxy-3,7,11-trimethyldodec-2-enoate is prepared from ethyl 4-chloro-5-hydroxy-11-methoxy-3,7,11-trimethyldodec-2-enoate.

EXAMPLE 4

A mixture of 0.87 g. of ethyl 4-chloro-5-methanesulfonyloxy-3,7,11trimethyldodec-2-enoate, 0.34 g. of 1,5-diazobicyclo[5,4.0]undec-5-ene and 30 ml. of dimethylformamide is stirred, under nitrogen, at room temperature for 3 hours. The mixture is diluted with ether, washed with 10 percent HCl, saturated sodium bicarbonate solution, water and brine, dried over calcium sulfate and solvent removed under reduced pressure to give ethyl 4-chloro-3,7,11-trimethyldodeca-2,4-dienoate, which can be purified by thin-layer chromatography eluting with ether/hexane (1/5).

Ethyl 4-chloro-11-methoxy-3,7,11-trimethyldodeca-2,4-dienoate is prepared from ethyl 4-chloro-5methanesulfonyloxy-11-methoxy-3,7,11-trimethyldodec-2-enoate using the process of this example.

EXAMPLE 5

Diethyl 3-ethoxycarbonyl-2-methylprop-2-enyl phosphonate (0.1 mole) is added dropwise, at 20°, to a slurry of 0.1 mole of NaH in 400 ml. of tetrahydrofuran. The mixture is stirred about one hour or until hydrogen evolution ceases. Then 0.1 mole of bromine is added dropwise to the mixture, with stirring, while cooling in a cooling bath (0° to −20°). At about 0°, additional NaH (0.1 mole) is added and stirred until evolution of hydrogen ceases. Then 0.1 mole of 3,7-dimethyloct-6-en-1-al is added dropwise and left overnight at room temperature. The reaction mixture is worked up by washing with water, extracting with ether, drying over calcium sulfate, and evaporation of solvent under reduced pressure to give ethyl 4-bromo-3,7,11-trimethyldodeca-2,4,10-trienoate, which can be purified by chromatography, if desired.

By repeating the process of this example using chlorine in place of bromine, there is prepared ethyl 4-chloro-3,7,11-trimethyldodeca-2,4,10-trienoate.

EXAMPLE 6

Following the procedure of Example 1, each of the esters under Column I is epoxidized to prepare the respective 4,5-epoxide under Column II:

I isopropyl 3,7,11-trimethyldodeca-2,4-dienoate,
ethyl 3,7,10,11-tetramethyldodeca-2,4-dienoate,
ethyl 3,7,11-trimethyltrideca-2,4-dienoate,
ethyl 3,7,10-trimethylundeca-2,4-dienoate,
ethyl 3,7,10-trimethyldodeca-2,4-dienoate,
isopropyl 11-methoxy-3,7,11-trimethyldodeca-2,4-dienoate,
isopropyl 11-methoxy-3,7,11-trimethyltrideca-2,4-dienoate,
ethyl 11-methoxy-3,7,10,11-tetramethyldodeca-2,4-dienoate,
ethyl 11-chloro-3,7,11trimethyldodeca-2,4-dienoate,
ethyl 10-methoxy-3,7,10-trimethylundeca-2,4-dienoate,
ethyl 11-acetoxy-3,7,11-trimethyldodeca-2,4-dienoate,
ethyl 3,11-dimethyl-7-ethyltrideca-2,4-dienoate.

II isopropyl 4,5-oxido-3,7,11-trimethyldodec-2-enoate,
ethyl 4,5-oxido-3,7,10-11-tetramethyldodec-2-enoate,
ethyl 4,5-oxido-3,7,11-trimethyltridec-2-enoate,
ethyl 4,5-oxido-3,7,10-trimethylundec-2-enoate,
ethyl 4,5-oxido-3,7,10-trimethyldodec-2-enoate,
isopropyl 4,5-oxido-11-methoxy-3,7,11-trimethyldodec-2-enoate,
isopropyl 4,5-oxido-11-methoxy-3,7,11-trimethyltridec-2-enoate,
ethyl 4,5-oxido-11-methoxy-3,7,10,11-tetramethyldodec-2-enoate,
ethyl 4,5-oxido-11-chloro-3,7,11-trimethyldodec-2-enoate,
ethyl 4,5-oxido-10-methoxy-3,7,10-trimethylundec-2-enoate,
ethyl 4,5-oxido-11-acetoxy-3,7,11-trimethyldodec-2-enoate,
ethyl 4,5-oxido-3,11-dimethyl-7-ethyltridec-2-enoate.

EXAMPLE 7

Using the process of Example 2, each of the epoxides under Column II is converted into the respective chlorohydrin under Column III:

III isopropyl 4-chloro-5-hydroxy-3,7,11-trimethyldodec-2-enoate,
ethyl 4-chloro-5-hydroxy-3,7,10,11-tetramethyldodec-2-enoate,
ethyl 4-chloro-5-hydroxy-3,7,11-trimethyltridec-2-enoate,
ethyl 4-chloro-5-hydroxy-3,7,10-trimethylundec-2-enoate,
ethyl 4-chloro-5-hydroxy-3,7,10-trimethyldodec-2-enoate,
isopropyl 4-chloro-5-hydroxy-11-methoxy-3,7,11-trimethyldodec-2-enoate,
isopropyl 4-chloro-5-hydroxy-11-methoxy-3,7,11-trimethyltridec-2-enoate,
ethyl 4-chloro-5-hydroxy-11-methoxy-3,7,10,11-tetramethyldodec-2-enoate,
ethyl 4-chloro-5-hydroxy-11-chloro-3,7,11-trimethyldodec-2-enoate,
ethyl 4-chloro-5-hydroxy-10-methoxy-3,7,10-trimethylundec-2-enoate,
ethyl 4-chloro-5-hydroxy-11-acetoxy-3,7,11-trimethyldodec-2-enoate,
ethyl 4-chloro-5-hydroxy-3,11-dimethyl-7-ethyltridec-2-enoate.

By use of the process of Example 3, each of the chlorohydrins under Column III is converted into the respective 5-mesylate, which is used in the process of Example 4 to prepare the respective 4-chloro-2,4-diunsaturated compound under Column IV.

IV isopropyl 4-chloro-3,7,11-trimethyldodeca-2,4-dienoate,
ethyl 4-chloro-3,7,10,11-tetramethyldodeca-2,4-dienoate,
ethyl 4-chloro-3,7,11-trimethyltrideca-2,4-dienoate,
ethyl 4-chloro-3,7,10-trimethylundeca-2,4-dienoate,
ethyl 4-chloro-3,7,10-trimethyldodeca-2,4-dienoate,
isopropyl 4-chloro-11-methoxy-3,7,11-trimethyldodeca-2,4-dienoate,
isopropyl 4-chloro-11-methoxy-3,7,11-trimethyltrideca-2,4-dienoate,
ethyl 4chloro-11-methoxy-3,7,10,11-tetramethyldodeca-2,4-dienoate,
ethyl 4,11-dichloro-3,7,11-trimethyldodeca-2,4-dienoate,
ethyl 4-chloro-10-methoxy-3,7,10-trimethylundeca-2,4-dienoate,
ethyl 4chloro-11-acetoxy-3,7,11-trimethyldodeca-2,4-dienoate,
ethyl 4-chloro-3,11-dimethyl-7-ethyltrideca-2,4-dienoate.

EXAMPLE 8

The process of Example 5 is repeated using each of 3,7-dimethylnon-6-en-1-al, 3,7-dimethyloctan-1-al, 3,7,7,-trimethyloctan-1-al, 7-hydroxy-3,7-dimethyloctan-1-al, 3,6-dimethylhept-5-en-1-al, 3,6,7-trimethyloct-6-en-1-al, 6-hydroxy-3,6-dimethylheptan-1-al and 7-hydroxy-3,6,7-trimethyloctan-1-al as the aldehyde reactant in place of 3,7-dimethyloct-6-en-1-al to prepare the respective 4-bromo-2,4-diunsaturated ester under Column V.

V ethyl 4-bromo-3,7,11-trimethyltrideca-2,4,10-trienoate,
ethyl 4-bromo-3,7,11-trimethyldodeca-2,4-dienoate,
ethyl 4-bromo-3,7,11,11-tetramethyldodeca-2,4-dienoate,
ethyl 4-bromo-11-hydroxy-3,7,11-trimethyldodeca-2,4-dienoate,
ethyl 4-bromo-3,7,10-trimethylundeca-2,4,9-trienoate,
ethyl 4-bromo-3,7,10,11-tetramethyldodeca-2,4,10-trienoate,
ethyl 4-bromo-10-hydroxy-3,7,10-trimethylundeca-2,4-dienoate,
ethyl 4-bromo-11-hydroxy-3,7,10,11-tetramethyldodeca-2,4-dienoate.

In the same way, the 4-chloro derivatives otherwise corresponding to the esters under Column V can be prepared.

EXAMPLE 9

A mixture of 4.5 g. of ethyl 4-chloro-3,7,11-trimethyldodeca-2,4-dienoate, 35 ml. of ethanol, 10 ml. of water and 7 ml. of 50 percent aqueous sodium hydroxide is refluxed for about 16 hours. The mixture is then diluted with water, neutralized and extracted with ether. The organic phase is washed with water, dried and evaporated to yield 4-chloro-3,7,11-trimethyldodeca-2,4-dienoic acid.

By use of the process of this Example, other acids of formula A can be prepared by hydrolysis of the respective ester of formula A.

EXAMPLE 10

A mixture of 3.0 g. of sodium acetate and 20 ml. of acetic anhydride is stirred at room temperature for 0.5 hour. To the mixture is added 2.7 g. of ethyl 4-chloro-11-hydroxy-3,7,11-trimethyldodeca-2,4-dienoate. The mixture is warmed up to about 80° and left for about 16 hours. After cooling, the mixture is poured into saturated sodium bicarbonate and extracted with ether. The combined ether extracts are washed with aqueous sodium bicarbonate, water and saturated sodium chloride solution, dried over calcium sulfate and evaporated under reduced pressure to yield ethyl 4-chloro-11-acetoxy-3,7,11-trimethyldodeca-2,4-dienoate.

EXAMPLE 11

To a solution of 2.0 g. of ethyl 4-chloro-3,7,11-trimethyldodeca-2,4,10-trienoate in 30 ml. of ethanol, cooled in an ice bath, is slowly added 5.2 g. of acetyl chloride. The reaction mixture is allowed to rise to room temperature and then stirred for about 60 hours. The mixture is concentrated under reduced pressure and then poured into water/hexane. The organic layer is separated, washed with aqueous sodium bicarbonate, water and brine, dried over calcium sulfate and solvent removed to yield ethyl 4,11-dichloro-3,7,11-trimethyldodeca-2,4-dienoate.

EXAMPLE 12

To 0.5 g. of 4-chloro-11methoxy-3,7,11-trimethyldodeca-2,4-dienoic acid in 10 ml. of benzene, under nitrogen, is added 0.17 ml. of oxalyl chloride. The mixture is stirred for about one hour and then allowed to stand 1.5 hours. Two ml. of isobutanol is added. After three hours, ether is added. The mixture is washed with aqueous sodium bicarbonate, water and brine, dried over calcium sulfate and concentrated under reduced pressure to yield isobutyl 4-chloro-11-methoxy-3,7,11-trimethyldodeca-2,4-dienoate.

Using each of t-butanol, cyclopentanol, benzyl alcohol, phenol, s-butanol and methanol in the above process, there is prepared:

t-butyl 4-chloro-11-methoxy-3,7,11-trimethyldodeca-2,4-dienoate,
cyclopentyl 4-chloro-11-methoxy-3,7,11-trimethyldodeca-2,4-dienoate,
benzyl 4-chloro-11-methoxy-3,7,11-trimethyldodeca-2,4-dienoate,
phenyl 4-chloro-11-methoxy-3,7,11-trimethyldodeca-2,4-dienoate,
s-butyl 4-chloro-11-methoxy-3,7,11-trimethyldodeca-2,4-dienoate,
methyl 4-chloro-11-methoxy-3,7,11-trimethyldodeca-2,4-dienoate.

EXAMPLE 13

To an ice cold solution of 2.0 g. of isopropyl 4-chloro-3,7,11-trimethyldodeca-2,4,10-trienoate in 80 ml. of isopropanol is added 2.29 g. of mercuric acetate over about 15 minutes. The mixture is stirred at ice temperature for 3 hours and then at room temperature for about 17 hours. A solution of 1.21 g. of potassium hydroxide, 5 ml. of water, and 20 ml. of isopropanol is then added to the mixture cooled in an ice bath. Then 0.126 g. of sodium borohydride is added in small portions and stirring continued for one hour. The mixture is then stirred with Celite and mercury filtered off. The filtrate is concentrated under reduced pressure, diluted with water and extracted with ether. The combined ether extracts are washed with water and brine, dried over calcium sulfate and solvent removed to yield isopropyl 4-chloro-11-isopropoxy-3,7,11-trimethyldodeca-2,4-dienoate.

EXAMPLE 14

A solution of 0.1 mole of triphenylphosphine 3-ethoxy-carbonyl-1-chloro-2-methylprop-2-ene (prepared from triphenylphosphine-3-ethoxycarbonyl-2-methylprop-2-ene using phenyl iodide chloride in triethylamine by the method of Märkl, supra) and 0.1 mole of 3,7-dimethyloct-6-en-1-al in toluene, under nitrogen, is refluxed about 6 hours. Toluene is removed under reduced pressure, pentane added and the mixture filtered. The filtrate (combined with pentane washings) is evaporated under reduced pressure to yield ethyl 4-chloro-3,7,11-trimethyldodeca-2,4,10-trienoate, which can be purified by chromatography.

Other aldehydes of formula V, such as the aldehydes of Example 8, are suitable starting materials for the process of this Example.

EXAMPLE 15

The process of Example 2 is repeated using HF in place of HCl to prepare ethyl 4-fluoro-5-hydroxy-3,7,11-trimethyldodec-2-enoate and, similarly, ethyl 4-fluoro-5-hydroxy-11-methoxy-3,7,11-trimethyldodec-2-enoate. Each of these fluorohydrins is converted into the respective 5-mesylate and then used in the process of Example 4 to prepare ethyl 4-fluoro-3,7,11-trimethyldodeca-2,4-dienoate and ethyl 4-fluoro-11-methoxy-3,7,11-trimethyldodeca-2,4-dienoate, respectively.

EXAMPLE 16

Triphenylphosphine-3-ethoxycarbonyl-1-iodo-2-methylprop-2-ene (prepared by the method of Märkl, supra, from triphenylphosphine-3-ethoxycarbonyl-2-methylprop-2-ene using elemental iodine) is reacted with each of 3,7-dimethyloctan-1-al and 7-methoxy-3,7-dimethyloctan-1-al using the procedure of Example 14 to produce ethyl 4-iodo-3,7,11-trimethyldodeca-2,4-dienoate and ethyl 4-iodo-11-methoxy-3,7,11-trimethyldodeca-2,4-dienoate, respectively.

What is claimed is:

1. A compound selected from those of the formula:

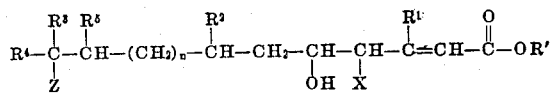

wherein,
$n$ is one or two;
$R'$ is lower alkyl, cycloalkyl, aryl or aralkyl;
each of $R^1$, $R^2$, $R^3$ and $R^4$ is methyl or ethyl;
$R^5$ is hydrogen or methyl;
X is a halogen atom; and
Z is hydrogen, chloro, hydroxy, lower alkoxy or lower acyloxy.

2. A compound according to claim 1 wherein $R^1$ is methyl and Z is hydrogen or lower alkoxy of one to four carbon atoms.

3. A compound according to claim 2 wherein each of $R^2$, $R^3$ and $R^4$ is methyl; $n$ is two; Z is hydrogen, methoxy or ethoxy; and X is bromo or chloro.

4. A compound according to claim 3 wherein X is chloro and $R'$ is lower alkyl of one to four carbon atoms.

5. The compound, ethyl 4-chloro-5-hydroxy-3,7,11-trimethyldodec-2-enoate, according to claim 4.

6. The compound, ethyl 4-chloro-5-hydroxy-11-methoxy-3,7,11-trimethyldodec-2-enoate, according to claim 4.

7. The compound, isopropyl 4-chloro-5-hydroxy-11-methoxy-3,7,11-trimethyldodec-2-enoate, according to claim 4.

8. A compound according to claim 1 wherein $n$ is two; each of $R^1$, $R^2$ and $R^3$ is methyl; $R^4$ is methyl or ethyl; X is chloro; $R'$ is ethyl or isopropyl; and Z is hydrogen or methoxy.

9. A compound according to claim 1 wherein $n$ is one; each of $R^1$, $R^2$ and $R^3$ is methyl; $R^4$ is methyl or ethyl; $R^5$ is hydrogen; X is chloro; Z is hydrogen or methoxy; and $R'$ is ethyl.

10. A compound according to claim 1 wherein $n$ is two; each of $R^1$, $R^2$, $R^3$, $R^4$ and $R^5$ is methyl; $R'$ is ethyl; Z is hydrogen or methoxy; and X is chloro.

* * * * *